Dec. 18, 1956     R. H. COTTON ET AL     2,774,671
PRODUCING DRY VEGETABLE MOLASSES PRODUCT
Filed Dec. 6, 1950
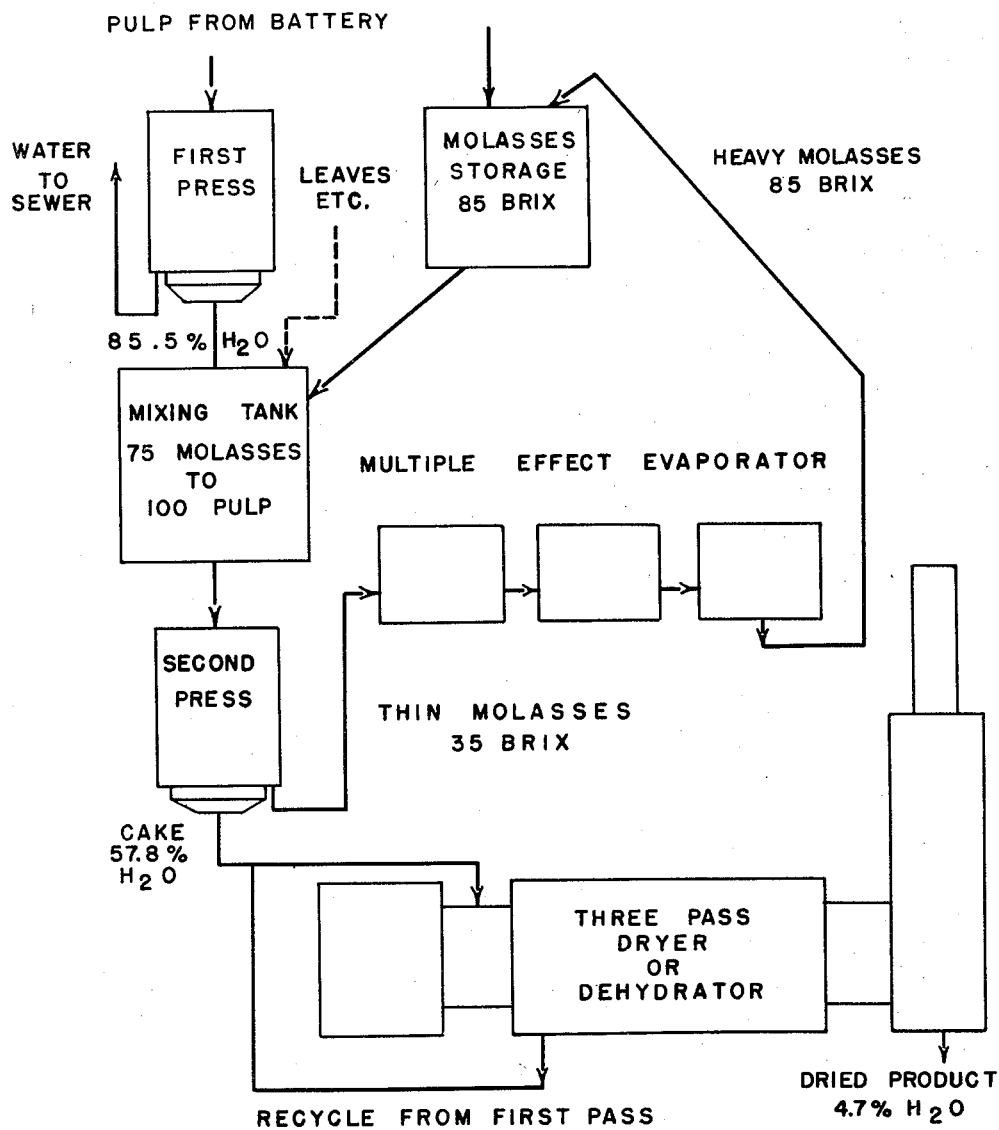
INVENTORS
Robert H. Cotton &
Guy O. Rorabaugh
BY *Lampheret Van Valkenburgh*
ATTORNEYS

United States Patent Office 2,774,671
Patented Dec. 18, 1956

2,774,671

PRODUCING DRY VEGETABLE-MOLASSES PRODUCT

Robert H. Cotton, Harbor Beach, Mich., and Guy O. Rorabaugh, Colorado Springs, Colo., assignors to Holly Sugar Corporation, Colorado Springs, Colo., a corporation of New York Application December 6, 1950, Serial No. 199,536

10 Claims. (Cl. 99—6)

This invention relates to the production of a relatively dry vegetable product having a substantial proportion of molasses solids. As used herein, the term "molasses solids" means not only sugar molasses derived from sugar cane or sugar beets, but also corn syrup or molasses, and sacchariferous liquids or solutions obtained from other sources, such as citrus fruits and the like. Also, the vegetable matter being treated may be the pulp or leaves of the plant from which the sacchariferous solution was obtained, or the pulp or leaves of another plant.

To provide a suitable feed, as for bovine, equine and similar herbivorous animals, it has long been desirable to fortify or add to the food value of vegetable products such as processed pulp, leaves, and the like, which have a low calorie content, although often possessing minerals or vitamins or similarly desirable constituents to varying degrees. This is particularly true in the case of the pulp of sugar beets, after the sugar has been extracted; the pulp of citrus fruits, after the juice has been removed; and also of leafy vegetable material, such as beet leaves, alfalfa and the like. In the case of beet pulp, immediately subsequent to the extraction of the sugar content, as by hot water in a diffusion battery, the pulp is very wet, and even after drainage of water and pressing, the water or moisture content is extremely high. In some instances, it is the practice to feed the beet pulp, after drainage and pressing, to cattle, sheep or the like, but such feeding is generally limited to an area immediately adjacent the beet sugar mill, since the shipping costs of a product having such a high water content are prohibitive. It is therefore customary, at perhaps a majority of the beet sugar mills, to dry the beet pulp, as in a rotary drum, for easier handling, storage and shipping. However, even after drying, the pulp consists mostly of cellulose with whatever minerals, vitamins and the like remain after processing; and it has therefore been deemed desirable to mix a sacchariferous product of relatively low market value, such as relatively impure molasses, with the beet pulp, to increase the food energy value of the product. However, such mixing alone usually results in a rather messy and sticky product, which is difficult to handle and cannot be stored or shipped in the same manner as a dry product. Thus, it has become customary in certain instances to add the molasses to the pulp prior to drying, so that the resultant product will not only be dry, and therefore more readily stored, handled and shipped, but also will have an enhanced food energy value. However, for a single pass drum dryer, the upper limit of molasses which can readily be added results in only about 25% to 35% molasses solids on pulp solids. If a greater amount or proportion of molasses is added to the pulp, the mixture tends to stick to the dryer, thereby tending to ignite and burn due to prolonged exposure to the high temperatures used in the dryer, and the resultant product also tends to be excessively hygroscopic. A substantial increase in the amount of citrus molasses which may be added to citrus pulp has been obtained by utilizing a three pass drum dryer, with recycling of a portion of the partially dried product from the first pass back to the initial mixer at which the molasses is added, but the cost of such drying is excessive and the equipment cost is also high, due to the limited capacity of the dryer.

At present, it is customary either to feed beet leaves to stock on the field after the beets are harvested, or store them in a silo for future use as a feed. Due to the high moisture content of the leaves and the comparatively low capacity of dryers adapted to be used with this type of product, dehydration of leaves has in the past been considered to be uneconomical.

Among the objects of the present invention are to provide a novel method of producing a relatively dry vegetable product having a substantial proportion of molasses solids; to provide such a method which is particularly adapted to treat vegetable matter having a high water content; to provide such a method which produces a marked economy in the drying or water removal operations; to provide such a method which results in an increased output of the drying equipment used; to provide such a method which results in a novel molasses fortified beet pulp product; and to provide such a method which produces a comparatively low cost of installation and equipment to carry out the same.

Additional objects and the novel features of this invention will become apparent from the description which follows, taken in connection with the accompanying drawing, which is a flow sheet or diagram of one example of the steps utilized in carrying out the method of this invention, applied to the addition of molasses to beet pulp, or to beet or other leaves.

In the method of this invention, as indicated in the drawing and as applied to beet pulp and beet molasses, the beet pulp coming from the diffusion battery, after drainage, is sent through a first or pulp press in a conventional manner, the water expressed from the pulp being discharged to waste, as to a sewer. After pressing, the pulp has a relatively high water content, such as 85.5%. From the first press, the pulp is discharged into a mixing tank, at which is added a comparatively large amount of a relatively concentrated or heavy sacchariferous solution, such as beet or cane molasses at 85 Brix, or commercial molasses at about 80 Brix, supplied to the mixing tank from a suitable source, such as a storage tank. The relative proportion of pulp and concentrated molasses supplied to the mixing tank may vary with the percentage of molasses solids to pulp solids desired in the final product, a suitable ratio being 75 lbs. of molasses to 100 lbs. of pressed pulp, although this ratio may vary from 25 to 200 lbs. of molasses for each 100 lbs. of pressed pulp. In the mixing tank, the mixture is allowed to stand for a sufficient period of time, such as two or more minutes, i. e. as long as 30 to 60 minutes, it having been discovered that such mixing and standing produced the unexpected result of the water in the pulp migrating to or being absorbed by the molasses solution. From the mixing tank, the mixture is discharged to a second press, at which a relatively dilute sacchariferous solution, such as a thin molasses at 35 Brix, can be expressed from the pulp, it being understood that sufficient sugar or sacchariferous material stays on or with the pulp to produce the desired ratio of molasses solids to pulp solids in the final dried product. Unexpectedly, the pulp from the second pressing operation was found to have a considerably lower water content than the pulp from the first pressing operation, such as only 57.8%. From the second press, the pulp product or cake may be passed through a single drum dryer, or through a three pass dryer or dehydrator as shown, in the latter of which a portion of the partially dried product is returned or recycled from the first pass to the dryer entrance, the final dried product having a sufficiently low water content, such as 4.7%, to be readily handled and stored, and to be economically shipped. In addition, the final dried product was found to have an unusually high ratio of molasses or sacchariferous solids to total solids, such as 66.8%, although lower or higher values of this percentage may be obtained, such as up to or exceeding 85%.

As will be evident, due to the comparatively low water content of the cake from the second press, i. e. 57.8% in the example shown, instead of approximately 70% moisture content, if a sufficient amount of the same molasses were added to the pressed pulp so that after drying the same ratio of molasses solids to pulp solids would be obtained, considerably less material must be passed through the dryer, and the dryer capacity will thus be increased considerably. (The above figure of 70% water in the mixture is obtained by the requirement that 34.68 lbs. of 85 Brix molasses would need to be added to 100 lbs. of pulp at 85.5% water, to obtain a final product having 66.8% molasses solids to total solids.)

The relatively dilute or thin molasses, as at 35 Brix, is passed through a multiple effect evaporator, to remove sufficient water to produce a relatively concentrated sacchariferous solution, such as heavy molasses at 85 Brix, for treatment of additional pulp. It will be understood, of course, that additional heavy molasses is required for additional pulp to be treated, as by a suitable source of supply thereof for the storage tank. In any event, the evaporator produces considerable economies, as will be hereinafter discussed in greater detail.

The method of this invention has also been successfully applied to the addition of molasses to beet leaves, alfalfa and potatoes, and may also be applied to citrus fruits and other vegetable materials. Such leaves or other vegetable matter may be supplied to the first press in substantially the same manner as the beet pulp, unless they are already sufficiently dry to make the first pressing unnecessary or not economically worthwhile. As will be evident, the first and second pressing operations may be carried out in the same press, although a smaller size press may be utilized for each of the first and second presses, and operated at a sufficient speed that a substantially continuous supply of pressed pulp is sent to the mixing tank and pressed cake to the dryer, to eliminate any necessity for storage capacity for the dryer.

Wet beet leaves that were harvested with a suction defoliator have been successfully treated in accordance with this invention. Thus, 2840 lbs. of wet beet leaves having a moisture content of 88.5% were sent through a large press, the moisture content of the resultant pressed leaves being 77.58%. The pressed leaves were mixed with concentrated molasses at about 85 Brix, in the proportion of 75 lbs. molasses to 100 lbs. of pressed leaves, and after standing, were sent to the press again, the moisture content of the resulting pressed cake being 49.2% and a dilute molasses at about 40 Brix being expressed from the cake. After drying to 5% moisture, the final product contained 33.5% molasses solids to total solids, or over 50% molasses solids to pulp or leaf solids.

It will be understood, of course, that a relatively concentrated molasses solution may be mixed with the leaves, or similar vegetable matter, directly and without first pressing the leaves or the like, particularly when the amount of water removed in a pressing operation prior to mixing is insufficient to justify the cost thereof. Also, it may be desirable to forego a first pressing operation on leaves because of the possibility of losing valuable mineral or similar content. In the case of wet beet pulp, the water removed in the first pressing operation tends to carry only insignificant amounts of valuable soluble material with it. However, in the case of beet leaves or alfalfa leaves, for instance, the first pressing, prior to the addition of concentrated molasses, may tend to cause the loss of valuable soluble material which will be retained when the concentrated molasses is mixed with the leaves, and the mixture allowed to stand, prior to pressing. In addition, there may be some types of vegetable matter, such as potatoes, which require special types of pressing equipment, but which, nevertheless, may be pressed with usual types of equipment after mixing with concentrated molasses and allowed to stand for a predetermined period of time.

In addition to the economies effected both in equipment, installation and operating costs through an increased capacity of the dryer, as discussed previously, additional economies are effected through the ability to remove the water from the dilute molasses or sacchariferous solution, to produce concentrated molasses or sacchariferous solution usable for additional pulp, by multiple effect evaporation. It is generally considered that approximately 1500 B. t. u. are required to evaporate 1 lb. of water in a drum type dryer, whereas generally only approximately 800 B. t. u. are required to evaporate 1 lb. of water from a liquid or solution in a multiple effect evaporator. Thus, each pound of water that can be removed in a multiple effect evaporator, rather than in a dryer, results in a saving of 700 B. t. u. The comparative calculations which follow show the fuel savings for drying, as well as the increased output of a given dryer, made possible by the method of this invention.

For instance, assume that a dryer having a capacity of 9000 lbs. of water evaporation per hour is utilized with the previous system in which molasses is merely mixed with the pressed pulp and then dried, and assume the use of wet pressed pulp at 85.5% water and molasses at 85 Brix. Also, assume that the final product is to contain 4.7% water, and have a molasses solids to total solids proportion of 66.8%. (Further, assume that such a dryer would be capable of producing such a final product without the molasses sticking to the dryer and igniting and burning due to prolonged exposure to high temperature.)

For each 100 lbs. of wet pressed pulp at 85.5% water there will be 14.5 lbs. of solids. To produce a molasses solids to total solids proportion of 66.8%, it will be necessary to add $$\frac{14.5 \times 0.668}{1.00 - 0.668} = 29.17 \text{ lbs. molasses solids}$$

For 29.17 lbs. molasses solids, it will be necessary to add $$\frac{29.7}{.85} = 34.3 \text{ lbs. concentrated molasses}$$

to 100 lbs. of wet pressed pulp.

Also, 14.5 lbs.+29.2 lbs.=43.7 lbs. total solids in final product.

And, for each 100 lbs. of wet pressed pulp, there will be $$\frac{43.7}{1.00 - .047} = 45.9 \text{ lbs. final product}$$

The total weight of the feed will be 100 lbs. pressed pulp+34.7 lbs. concentrated molasses=134.7 lbs.

And, the water to be evaporated will be $$134.7 - 45.9 = 88.8 \text{ lbs. water}$$

for each 45.9 lbs. product.

On a tonnage basis, there will be $$\frac{88.8}{45.9} = 1.93 \text{ tons of water}$$

to be evaporated for each ton of product.

The output of the dryer, having a capacity of evaporating 9000 lbs. or 4.5 tons per hour, will then be $$\frac{4.5}{1.93} = 2.33 \text{ tons per hour}$$

of the dry product.

In comparison, utilizing the method of this invention, since it was found that a cake of pulp mixed with molasses and then pressed, having 58.7% water, would produce a proportion in the final product of 66.8% molasses solids to total solids, for each 100 lbs. of solids in the final product, there should be $$\frac{100}{1.00-.587}=242.1 \text{ lbs. of pulp}$$

pressed with molasses.

This will produce 104.7 lbs. of the dry product, and the relative amount of water to be evaporated will be 242.1−104.7=137.2 lbs.

Also, $$\frac{137.2}{104.7}=1.31 \text{ tons of water}$$

to be evaporated for each ton of the final product. Then, the output of the dryer would be $$\frac{4.5}{1.31}=3.43 \text{ tons per hour}$$

of the dry product.

As will be evident, a comparison of the output of 3.43 tons per hour with 2.33 tons per hour, shows a 47.2% greater output of the dryer when utilizing the method of this invention.

The fuel economies involved are also marked. Thus, for each ton of dry product, it is necessary to evaporate 1.93 tons of water per hour for each system, but when all the evaporation is done in a dryer, it will require $1.93 \times 1500$ B. t. u. $\times 2000 = 5790 \times 10^3$ B. t. u. per hour per ton dry product. In comparison, with the method of this invention, only 1.31 tons of water per hour are evaporated in the dryer, whereas the remaining water, i. e. 0.62 ton, is evaporated in a multiple effect evaporator. Thus, the heat supplied at the dryer will be $1.31 \times 1500 \times 2000 = 3930 \times 10^3$ B. t. u. per hour per ton dry product, and at the evaporator will be $$0.62 \times 800 \times 2000 = 992 \times 10^3 \text{ B. t. u.}$$

per hour per ton dry product. The total B. t. u. will thus be $3930 \times 10^3 + 992 \times 10^3 = 4922 \times 10^3$ B. t. u. per hour per ton dry product.

Subtracting, 5790−4922=868 difference, and $$\frac{868}{5790} \times 100\% = 15\% \text{ fuel saving}$$

As will also be evident, a fuel saving of 15% is equal to 868,000 B. t. u. per ton of dry product, a not inconsiderable amount.

The increased capacity of the dryer is also marked in the case of the beet leaves which were treated in accordance with this invention. Again, assuming 5% water and 33.5% molasses solids on total solids in the final product, first calculate the dryer output when all of the moisture is removed in the dryer.

Beet leaves having an initial water content of 82.5%, and pressed to a water content of 77.58%, will contain 22.4 lbs. solids for each 100 lbs. leaves.

For each 22.4 lbs. solids, to produce 33.5% molasses solids on total solids, it will be necessary to add $$\frac{22.4 \times 33.5}{100-33.5}=11.28 \text{ lbs. molasses solids}$$

Thus, $$\frac{11.28}{.85}=13.3 \text{ lbs. molasses}$$

to be added to 100 lbs. pressed leaves.

And, 22.4+11.3=33.7 lbs. solids for each 100 lbs. pressed leaves.

Then, $$\frac{33.7}{.95}=35.5 \text{ lbs. final product}$$

for each 100 lbs. leaves.

The total weight feed for each 100 lbs. pressed leaves will be 100+13.3=113.3 lbs.

Also, 113.3−35.5=77.8 lbs. water to be evaporated for each 35.5 lbs. final product.

And, $$\frac{77.8}{35.5}=2.19 \text{ tons water per ton final product}$$

to be evaporated

For a 4.5 ton dryer, the output then will be $$\frac{4.5}{2.19}=2.05 \text{ tons per hour final product}$$

In comparison, with the method of this invention, the water content of the pressed molasses mixed cake was found to be 49.2%, and for each 100 lbs. of solids in the final product, the initial feed will be $$\frac{100}{1.00-.492}=196.9 \text{ lbs. feed}$$

Since the final product has a moisture content of 5%, for each 100 lbs. solids there will be $$\frac{100}{.95}=105.1 \text{ lbs. of dry product}$$

And, 196.9−105.1=91.8 lbs. water to be removed in the dryer for each 100 lbs. solids.

Or, $$\frac{91.8}{105.1}=0.87 \text{ ton water per ton dry product}$$

to be removed in the dryer.

And the output of a 4.5 ton dryer will then be $$\frac{4.5}{0.87}=5.17 \text{ tons per hour}$$

Thus, in comparison, the output of the dryer is increased by $$\frac{5.17-2.05}{2.05}=152.7\% \text{ increase in output of the dryer}$$

The fuel saving is also quite marked, since by merely mixing molasses with the pressed leaves and then drying, the amount of heat required for drying will be $2.19 \times 1500 \times 2000 = 6570 \times 10^3$ B. t. u. per ton.

However, by the method of this invention, only 0.87 ton of water per ton dry product need to be evaporated in the dryer, which will require $0.87 \times 1500 \times 2000 = 2510 \times 10^3$ B. t. u. per ton.

The remainder of the water, i. e. 2.19−0.87=1.32 tons per ton of dry product, will be removed in the evaporator, so that $1.32 \times 800 \times 2000 = 2112 \times 10^3$ B. t. u. per ton dry product will be required for the evaporator. Thus, the total amount of heat required will be $2610 \times 10^3 + 2112 \times 10^3 = 4722 \times 10^3$ B. t. u. per ton dry product.

And, the resultant saving in fuel will be $$\frac{6570-4722}{6570}=28.1\%$$

As will be evident, the product produced after the relatively dilute molasses has been expressed from the mixture of pressed (or unpressed) vegetable matter and concentrated molasses, is a novel product, particularly in the case of beet pulp fortified with molasses, which is undried and may have a moisture content of less than 60% and a ratio of molasses solids to pulp solids in excess of 0.40. This product may be further dried as in the manner described above, or may be utilized in other ways. For instance, the product may be compounded with commercially available dry materials and made into a pellet or the like, thus eliminating a dryer or dehydrator. Thus, the product may be mixed with alfalfa meal, ground corn, cottonseed cake, dried beet pulp, or mixtures of the same, to form pellets useful as feed. Such a pellet may, for example, contain 20% leaf solids and be made from a pressed and undried product of this invention, itself containing 30% leaf solids and 70% molasses solids, then mixed with one or more of the above commercially available dried products to form pellets. Again, if a relatively high proportion of molasses to beet leaves, for instance, were utilized, it would be possible to obtain a pressed and undried product having 30% to 40% moisture, also useful in forming feed pellets. As another example, beet leaves or pressed beet pulp may be mixed with concentrated Steffens filtrate, and utilized in making a poultry feed. Other and additional uses of a product comprising pressed and undried molasses fortified vegetable matter having a moisture content of less than 60% and a ratio of molasses solids to pulp solids in excess of 0.40, will be evident to those skilled in the art.

From the foregoing, it will be evident that the method of this invention fulfills to a marked degree the objects and requirements hereinbefore set forth. From the above calculations, it will be evident that the method of this invention produces a marked increase in the output of the dryer, and also a marked saving in heat required for drying. Also, the amount of molasses solids on the pulp or vegetable matter may be increased considerably, without difficulty in the drying operation or production of an objectionably hygroscopic product. The method of this invention is, of course, particularly useful in connection with vegetable matter having a high water content, since the water content of the vegetable and molasses cake, after contact and then pressing, is considerably lower than can be produced by only pressing the vegetable material. Furthermore, the increased output of the drying equipment results in considerable economies in installation and maintenance costs, for a plant of any given capacity. The drying equipment installation economy is, of course, subject to the cost of the multiple effect evaporators, but the latter have no rotating parts, and do not require expensive bearings and drive connections, which tend to produce maintenance expense.

Although the application of the method of this invention to the addition of beet molasses to beet pulp, and of beet molasses to beet leaves, alfalfa and potatoes, has been described specifically, it will be evident, as indicated, that the method of this invention may be applied to other types of leaves and plants, and also to citrus fruits and the like. In addition, as indicated, the sacchariferous solution need not have come initially from the vegetable matter being treated, but may come from some other source. Also, sacchariferous solutions which may usually be sent to waste, may be utilized in the method of this invention, as in the case of Steffens House waste liquor in a beet sugar factory, which may be concentrated to a desired point, for use in treating beet pulp.

The preferred concentrations of the molasses, and the preferred ratios of concentrated molasses to pressed vegetable matter are, of course, intended to be merely illustrative, since the proportions of molasses or sacchariferous solution to vegetable matter may be varied from the proportions shown in the specific examples, particularly if a different ratio of molasses solids to pulp solids is desired, or the final dried product is to contain more or less moisture than in the specific examples. Also, the proportions and concentrations may be varied for other types of sacchariferous solutions, depending upon the various factors and materials involved.

Although certain specific embodiments of this invention, and variations therein, have been described, it will be understood that other embodiments and additional variations may exist, all without departing from the spirit and scope of this invention.

What is claimed is:

1. A method of producing a relatively dry vegetable product having a substantial proportion of molasses solids, from vegetable matter having a high water content, which comprises pressing said vegetable matter to reduce the water content thereof; mixing a concentrated molasses with said pressed vegetable matter; permitting the mixture to stand for a sufficient period of time to cause moisture in the vegetable matter to dilute the molasses; pressing the mixed product to remove the dilute molasses; and drying the said pressed mixed product.

2. A method of producing a relatively dry vegetable product having a substantial proportion of molasses solids, from vegetable matter having a high water content, which comprises pressing said vegetable matter to reduce the water content thereof; mixing a concentrated molasses with said pressed vegetable matter; permitting the mixture to stand for a sufficient period of time to cause moisture in the vegetable matter to dilute the molasses; pressing the mixed product to remove dilute molasses; drying the said pressed mixed product; and evaporating water from the dilute molasses.

3. A method of producing a relatively dry vegetable product having a substantial proportion of sacchariferous solids, from vegetable matter having a high water content, which comprises pressing said vegetable matter to reduce the water content thereof; mixing a concentrated sacchariferous solution with said pressed vegetable matter; permitting the mixture to stand for a sufficient period of time to cause moisture in the vegetable matter to dilute the sacchariferous solution; pressing the mixed product to remove dilute sacchariferous solution; drying the said pressed mixed product; and evaporating water from the dilute sacchariferous solution by multiple effect evaporation so as to produce a more concentrated solution usable for treating additional vegetable matter.

4. A method of producing a relatively dry vegetable product having a substantial proportion of molasses solids, from vegetable matter having a high water content, which comprises pressing said vegetable matter to reduce the water content thereof; mixing a concentrated molasses with said pressed vegetable matter; permitting the mixture to stand for a sufficient period of time to cause moisture in the vegetable matter to dilute the molasses; pressing the mixed product to remove dilute molasses; drying the said pressed mixed product in a plurality of passes; recycling a portion of the partially dried product from a subsequent pass to the start of the first pass; and evaporating water from the dilute molasses.

5. A method of producing a relatively dry vegetable product having a substantial proportion of molasses solids, from beet pulp having a high water content, which comprises pressing said beet pulp to reduce the water content thereof; mixing a concentrated beet molasses with said beet pulp; permitting the mixture to stand for a sufficient period of time to cause moisture in the beet pulp to dilute the molasses; pressing the mixed product to remove the dilute molasses; and drying the said pressed mixed product.

6. A method of producing a relatively dry vegetable product having a substantial proportion of molasses solids, from beet pulp having a high water content, which comprises pressing said beet pulp to reduce the water content thereof; mixing a concentrated beet sugar production filtrate with said beet pulp; permitting the mixture to stand for a sufficient period of time to cause moisture in the beet pulp to dilute the filtrate; pressing the mixed product to remove the dilute filtrate; and drying the said pressed mixed product.

7. A method of producing a relatively dry vegetable product having a substantial proportion of molasses solids, from beet pulp having a high water content, approximately in excess of 90%, which comprises pressing said pulp to reduce the water content thereof to approximately 80% to 85%; mixing concentrated molasses at 80 Brix or greater with said pressed pulp, in the proportions of 25 to 200 lbs. of concentrated molasses to 100 lbs. of pressed pulp; permitting the mixture to stand for a sufficient period of time to cause moisture in the pulp to dilute the molasses to less than 50 Brix; pressing the mixed product to remove said dilute molasses; drying the said pressed mixed product to a water content of approximately 5%; and evaporating water from the dilute molasses by multiple effect evaporation so as to produce a concentrated molasses at 80 Brix or greater.

8. A method of producing a relatively dry vegetable product having a substantial proportion of molasses solids, as defined in claim 7, in which said concentrated molasses produced by multiple effect evaporation is utilized for treating additional pressed pulp.

9. A method of producing a relatively dry vegetable product having a substantial proportion of molasses solids, as defined in claim 7, in which at least 50 lbs. of concentrated molasses is added to each 100 lbs. of pressed pulp.

10. A method of producing a relatively dry vegetable product having a substantial proportion of molasses solids, as defined in claim 7, in which at least 75 lbs. of concentrated molasses is added to each 100 lbs. of pressed pulp.

References Cited in the file of this patent

UNITED STATES PATENTS

| | | |
|---|---|---|
| 1,005,536 | Goodlett | Oct. 10, 1911 |
| 1,286,742 | O'Rourke | Dec. 3, 1918 |
| 1,996,395 | Arnold | Apr. 2, 1935 |
| 2,420,517 | Brandner et al. | May 13, 1947 |